United States Patent [19]

Wu et al.

[11] Patent Number: 5,165,021
[45] Date of Patent: Nov. 17, 1992

[54] TRANSMIT QUEUE WITH LOADSHEDING

[75] Inventors: Li-Ran Wu, Norcross; Jeffrey B. Bentley, Atlanta, both of Ga.

[73] Assignee: Racal-Datacom, Inc., Sunrise, Fla.

[21] Appl. No.: 643,397

[22] Filed: Jan. 18, 1991

[51] Int. Cl.[5] ............................ G06F 11/14; H04J 3/00
[52] U.S. Cl. .................................. 395/250; 370/85.13; 370/60.1; 364/239.7; 364/260.1; 364/940.62; 364/942.06
[58] Field of Search ................. 320/60; 364/200, 900; 395/250, 275; 370/60, 60.1, 61, 85.13

[56] References Cited

U.S. PATENT DOCUMENTS

| | | | |
|---|---|---|---|
| 4,530,054 | 7/1985 | Hamster et al. | 395/550 |
| 4,783,730 | 11/1988 | Fischer | 395/275 |
| 4,896,261 | 1/1990 | Novan | 395/325 |
| 4,914,653 | 4/1990 | Bishop et al. | 370/85.6 |
| 4,922,503 | 5/1990 | Leone | 370/85.13 |
| 5,001,702 | 3/1991 | Teraslinna et al. | 370/60 |
| 5,043,981 | 8/1991 | Firootmand et al. | 370/85.1 |
| 5,058,051 | 10/1991 | Brooks | 395/425 |
| 5,079,762 | 1/1992 | Taube | 370/60 |

OTHER PUBLICATIONS

Racal-Milgo brochure "LanNet Express Ethernet/802.3 Network Interface Module".
Racal-Milgo brochure "LanNet Express".
Racal-Milgo brochure "CMS Express".
Racal-Milgo advertisement for Racalan Net Express.
Racal-Milgo White Paper "Lan Internetworking: The Next Evolutionary Step".
"Fundamentals of Data Structures in Pascal", E. Horowitz and S. Sahni.

Primary Examiner—Dale M. Shaw
Assistant Examiner—Robert S. Hauser
Attorney, Agent, or Firm—Jerry A. Miller; William A. Newton

[57] ABSTRACT

An apparatus for managing transfer of a packet of information to one of a plurality of ports with each the port having an associated port speed includes a double linked list transmit queue and a plurality of port queues corresponding to the plurality of ports. The packet is read to determine a priority and destination port of the packet. A loadsheding value correlating to the packet's destination port and priority is determined and compared with a measure of the amount of free space in the transmit queue. The packet is loaded into the transmit queue if the loadsheding value is less than or equal to the measure of the amount of free space in the transmit queue. The packet is discarded in the event the loadsheding value is greater than the measure of the amount of free space in the transmit queue.

16 Claims, 7 Drawing Sheets

TRANSMIT QUEUE WITH LOADSHEDING

BACKGROUND

Field of the Invention

This invention relates generally to the field of data communications. More particularly, this invention relates to a method and apparatus for management of queue memory in an internetworking communication processor handling messages of differing priorities and transmission media of differing speeds.

In a communication system which utilizes a single queue to service transmitters of varying speed, a simple first-in-first-out queue can result in inefficient utilization of the transmission media. This is due to the fact that high speed transmitters can empty the queue faster than low speed transmitters. Consequently, a large stream of data packets destined for a low speed transmitter can fill up the queue and prohibit new packets destined for the high speed transmitter from being loaded into the queue, even though those high speed transmitters may be idle. Although this problem can be eased somewhat by using more memory for queuing purposes, this is an expensive alternative.

The present invention addresses this problem in a communications processor which, in the preferred embodiment, is used to link various local area networks (LAN's) together using wide area network (WAN) links of varying speeds. Such an internetworking communications processor is commercially available from RACAL-MILGO as its RACALAN NETEXPRESS ™ communications processor which may be described as a MAC layer Bridge. This product is described in a document entitled "LAN Internetworking: The Next Evolutionary Step—A White Paper by Racal-Milgo", 1990 Racal-Milgo, which is hereby incorporated by reference. (The present invention was developed as an enhancement to this product and has not been put into the commercial product as of the filing date of this application.)

The present invention may also be applicable to more conventional bridges, gateways, routers, multiplexers and the like. A single buffer and queue arrangement is shared among the various output ports coupled to the wide area network links of the present invention. The speed of these ports can vary widely. Thus it is desirable to assure that the high speed links are not slowed down and rendered inefficient by queue overuse from low speed links. It is also desirable to assure that high priority packets used to manage the network are not discarded due to queues filled with lower priority packets. The present invention addresses these problems by use of a prioritization scheme for the packets and a loadsheding routine for determining when to load packets into the queue.

SUMMARY OF THE INVENTION

It is an object of the present invention to provide a method and apparatus which enhances utilization of buffer and queue memory in a communications processor.

It is an advantage that the present invention balances transmission over media of different transmission rages so that traffic using lower speed channels is less likely to jam transmit buffers and queues.

It is a further advantage of the present invention that smaller queue memory can be utilized more effectively than conventional first in first out queue arrangements.

These and other objects, advantages and features of the invention will become apparent to those skilled in the art upon consideration of the following description of the invention.

In one embodiment of the present invention an apparatus for managing transfer of a packet of information to one of a plurality of ports, with each the port having an associated port speed, includes a double linked list transmit queue and a plurality of port queues corresponding to the plurality of ports. The packet is read to determine a priority and destination port of the packet. A loadsheding value correlating to the packet's destination port and priority is determined and compared with a measure of the amount of free space in the transmit queue. The packet is loaded into the transmit queue if the loadsheding value is less than or equal to the measure of the amount of free space in the transmit queue. The packet is discarded in the event the loadsheding value is greater than the measure of the amount of free space in the transmit queue.

Another method according to the present invention for managing entry of a packet of information into a shared queue, the packet being destined for one or more ports includes the steps of: determining a priority and a destination port associated with the packet; determining a loadsheding factor associated with the packet's priority and the destination port; determining a number of blocks of the shared queue which are free; comparing a number representing the number of free blocks with the loadsheding factor; and inserting the packet into the queue if the loadsheding factor is less than or equal to the number representing the number of free blocks. The method preferably includes the step of discarding the packet if the loadsheding factor is greater than the number representing the number of free blocks.

A method for managing entry of a packet of information into a shared double linked list queue, the packet being destined for one or more output ports includes the steps of: determining a priority and a destination port associated with the packet; determining a loadsheding factor associated with the packet's priority and the destination port; the loadsheding factors increasing in value as a speed value associated with the port decreases in value and the loadsheding factors increasing in value as the priority of the packet decreases; determining a number of blocks of the shared queue are free; comparing a number representing the number of free blocks with the loadsheding factor; inserting the packet into the queue if the loadsheding factor is less than or equal to the number representing the number of free blocks; discarding the packet if the loadsheding factor is greater than the number representing the number of free blocks; decrementing the number representing the number of free blocks when the packet is inserted into the queue.

An apparatus for managing transfer of a packet of information to one of a plurality of ports, each of which having an associated port speed, includes a transmit queue and a plurality of port queues corresponding to the plurality of ports. The apparatus determines a priority and destination port of the packet and a loadsheding value correlating to the packet's destination port and priority. The apparatus compares the loadsheding value with a measure of the amount of free space in the transmit queue. The packet is loaded into the transmit queue if the loadsheding value is less than or equal to the measure of the amount of free space in the transmit queue. The packet is preferably discarded in the event the loadsheding value is greater than the measure of the amount of free space in the transmit queue. The transmit queue is preferably a double linked list.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
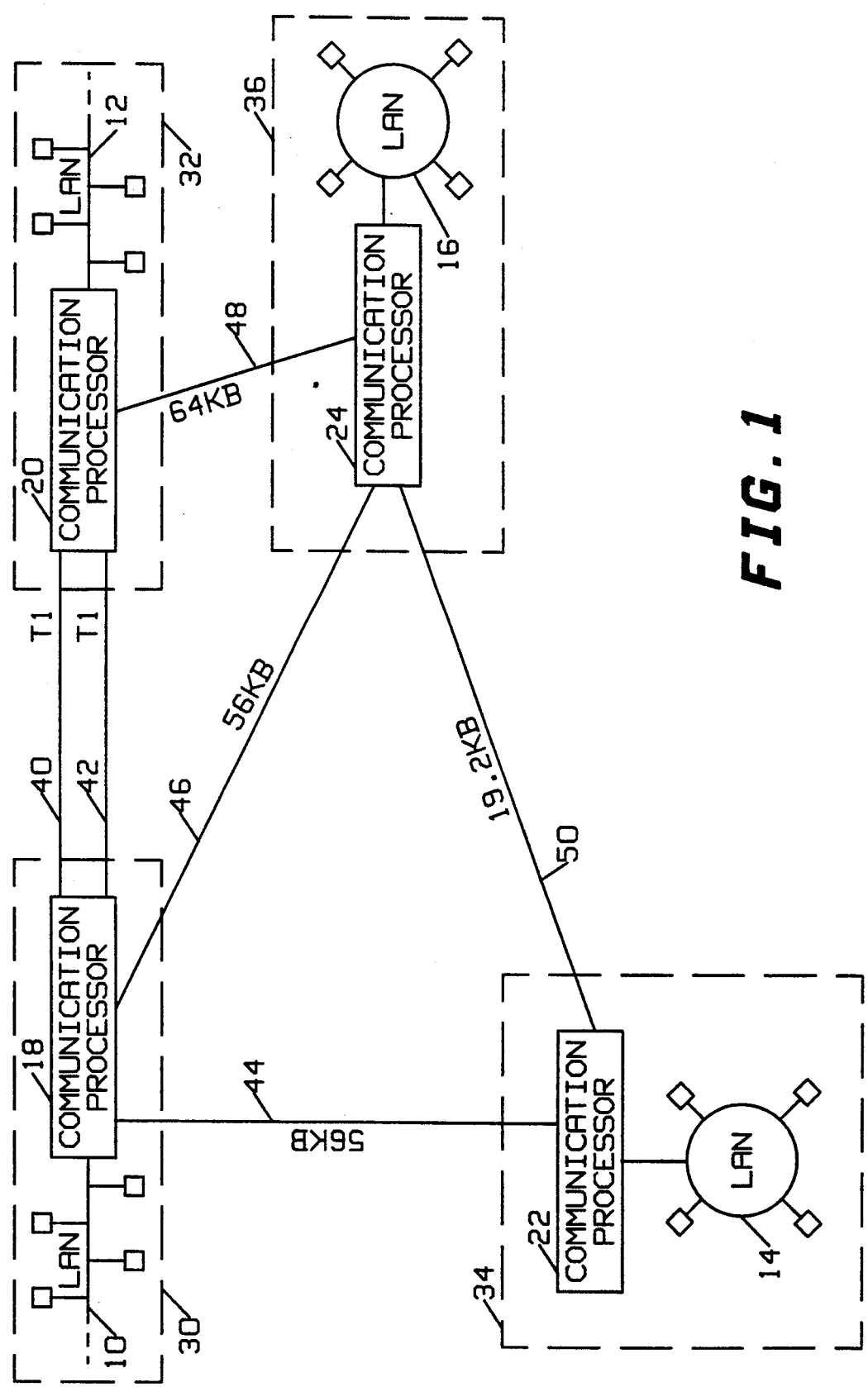
FIG. 1 is a diagram of a typical wide area network used in conjunction with examples to describe the overall environment of the present invention.

Referring to FIG. 1, an example network showing the environment of the present invention is shown. Other network configurations are, of course, also within the scope of the present invention. This network shows four local area networks (LAN's) 10, 12, 14 and 16, which are located in geographically different locations as indicated by the broken lines surrounding the LAN's. These four locations are designated 30, 32, 34 and 36 respectively. The LAN's are coupled together by various wide area network links via communications processors (CP's) 18, 20, 22 and 24.

For this example, assume that locations 30 and 32 are connected together by two high speed 1.544MB T1 links 40 and 42 due to the high data traffic between these two locations. Locations 30 and 34 and 30 and 36 are connected together by single 56KB links 44 and 46. Locations 32 and 36 are connected by a 64KB link 48, and locations 34 and 36 are connected by a 19.2KB modem link 50.

Figure 2:
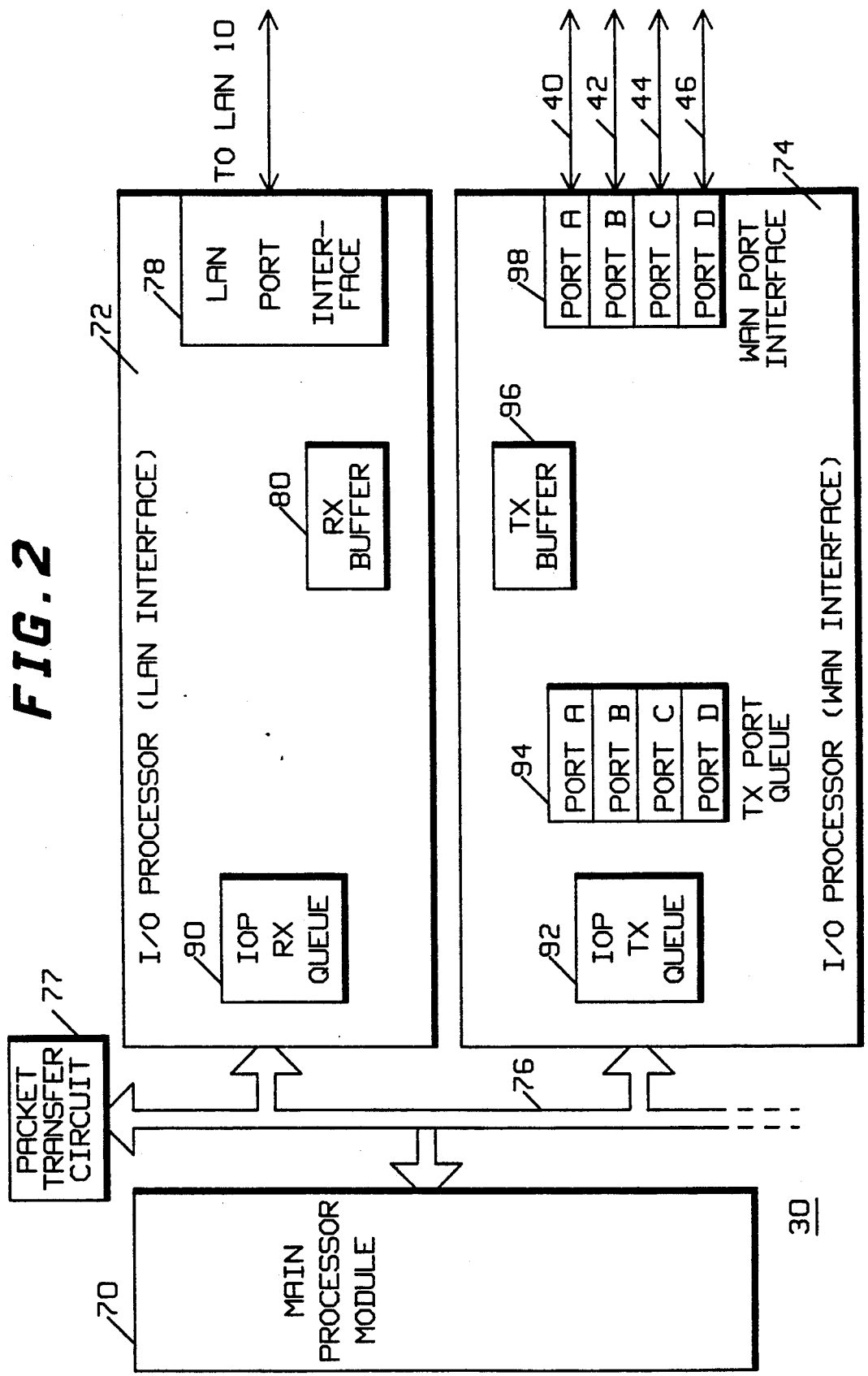
FIG. 2 shows a block diagram of a communication processor containing the present invention.

Consider now FIG. 2 showing a more detailed diagram of communication processor 18 of FIG. 1. This communication processor, which is similar in design to the communications processors 20, 22 and 24, includes a main processor module 70 which may be coupled to various types of Input/Output Processors (IOP) cards such as local area network IOP 72 and wide area network IOP 74 or hybrids of these. There is a bus connection 76 providing communication among the three modules 70, 72 and 74. Each of the IOP cards and the MP module contain one or more microprocessors based computers used to manipulate the information stored in the various buffer memories using conventional techniques. The hardware configuration of these cards is not relevant to the present invention except for the presence of one or more programmable processors on each card as well as the buffer and queue memories shown in FIG. 2.

Those skilled in the art will recognize that this modular configuration enables the communications processor to be readily adapted to many types of LAN and WAN connections by merely installing an appropriate IOP module with interfaces suitable for the desired connection. The preferred embodiment described below should not be construed as limiting, since whole packets may be used where descriptor packets are used in other embodiments. Also, fewer exchanges of packets or different arrangements of exchanges of packets from queue to queue may be made without departing from the present invention.

Communication between the several locations is carried out by transmission of packets of information. When a packet comes in to IOP 72 from LAN 10, it passes through an appropriate interface circuit 78 (specific to the type of LAN being serviced, e.g. Ethernet, Token Ring, etc.) and is placed in a receive buffer memory 80. A descriptor packet is then generated which contains, for example, the following fields describing the packet (other information arrangements may also be used):

CONTROL—This field describes the "ownership" of the packet. That is, whether the movement of the packet is currently under the control of the MP or the IOP. In addition, the field contains the type of destination of the packet (e.g. Communication Processor, individual destination, multicast destination, unknown destination), information describing the type of statistics which should be generated and maintained relating to the current packet and filtering information.

NEXT_DESC—This field contains the address of the next descriptor in the list.

RX_BUFFER—This field contains the address of the full packet contained in the RX Buffer 80.

IOM_PORT—This field contains the identifying information describing the particular port of the particular IOP over which the packet was received.

PACK_LENGTH—This field contains the length of the packet.

FILTER_DATA—This field contains various filtering information as well as the packet's destination address.

This descriptor packet is placed in an IOP receive queue 90 by the IOP 72. One such IOP receive queue is provided on each IOP card for all ports in the IOP board. The descriptor packets, being much shorter than the actual full packet received by the IOP is used for further processing since it can be copied and moved much more quickly than the full packet. The CONTROL field is modified when the descriptor packet is transferred to the IOP RX Queue to reflect ownership by the MP 70 rather than the IOP 72 which originally had ownership of the packet.

The next action is initiated by a periodic poll from the MP 70 to the IOP 72 IOP RX Queue 90 to see if the IOP 72 has received a packet to transmit. When the IOP RX Queue 90 indicates that there is a descriptor packet in the IOP Receive Queue 90 awaiting processing, and several additional fields are added to the descriptor packet as follows:

PRIORITY—This field contains an indication of the priority of the packet as described later in conjunction with TABLE 1.

PREV_DESC—This field contains the address of the previous descriptor packet in the IOP RX Queue. Together with the NEXT_DESC field, this field is used to manipulate the double linked list queue described later.

TX_PORTS—This is a field which describes which of the port or ports of the transmitting IOP should transmit the packet. This, for example, may be a 32 bit field which can represent 64 corresponding possible ports on a given IOP card. If, for example, bits number 2, 3 and 4 are set in the TX_PORTS field, this indicates that the present packet should be transmitted over ports 2, 3 and 4 of the IOP.

TIMESTAMP—This field is used to determine the age of the transmit descriptor packet.

The basic idea is that the MP 70 gets a copy of the RX description via a packet transfer circuit 77 and then creates a TX descriptor for each IOP that will need to transmit the packet. Main Processor 70 instructs the packet transfer circuit 77 to transfer the descriptor packet to the appropriate IOP Transmit Queue 92 of IOP 74 and to transfer the packet from the RX Buffer 80 to the TX Buffer 96 if needed. (Since the packet may be destined for the MP 70 itself, the MP 70 includes circuitry similar to the IOP for processing such packets. For simplicity, this circuitry is not shown, but will be understood to function in a manner similar to its analogous circuitry in the various IOP cards, as will be clear to those skilled in the art.)

The MP 70 determines which IOP is the appropriate destination of the packet from the destination address contained in the FILTER_DATA field of the descriptor packet. Since there may be several IOP's attached to a single MP 70 serving various interconnected LAN's and WAN's, the function of determining which IOP, and ultimately which IOP port the packet is to be shipped out over, is a primary task performed by the MP 70 module.

Upon determining that a particular port or ports of the IOP 74 is the destination of the packet, the TX_PORTS field of the TX descriptor packet is modified by the MP 70 as required to indicate which output port or ports to use and then the modified descriptor packet is sent to the IOP Transmit Queue 92 which is associated with the IOP 74. The "ownership" of the packet is then transferred to that IOP. These actions involve setting the appropriate bits of the TX_PORTS field and appropriately modifying the CONTROL field. Simultaneously, the actual packet in the receive buffer queue 80 is transferred to an IOP Transmit Buffer memory 96. The modified descriptor packet is next forwarded to a Transmit Port Queue 94 in a manner to be described in greater detail later.

At this point, when the descriptor packet is transferred to the TX Port Queue 94, the information added to the descriptor packet is deleted since it is not needed when the descriptor is stored in the TX Port Queue 94. The TX Port Queue 94 is partitioned into predetermined blocks of memory allocated to each of the ports 98 of the IOP 74. So, IOP TX Queue 92 is provided on the basis of one queue per IOP card and TX Port Queue 94 is provided on the basis of one queue per port on the IOP 74. In the current example, four queues are provided in TX Port Queue 94, one for each of the four ports of WAN port interface 98.

The WAN port interface 98 may be of any appropriate design such as an industry standard RS232, V35 or V11 connectors for interconnection to, for example, modems, DSU's or other access devices. The particular type of interface is not important to the present invention.

Since the IOP Transmit Queue 92 has a finite size, there will sometimes be occasions when the queue is overloaded and cannot accept other packets. For example, if a very low speed port were receiving a large number of packets for transmission, it would be comparatively low in emptying the queue. This could result in idle high speed links. It is preferable to minimize any such overloads while simultaneously minimizing the cost of the queue memory hardware. Since this queue must operate at very high speeds, it is implemented using high speed video RAM circuits such as the commercially available MT42C4064 made by Micron Technology. It is desirable to use a minimal amount of transmit queue memory since these devices are quite expensive. To this end, the present invention seeks to more effectively utilize this queue to assure that more important packets are always given priority over less important packets taking into consideration the speed at which the transmit buffers are emptied by WAN connections of varying speeds.

Figure 3:
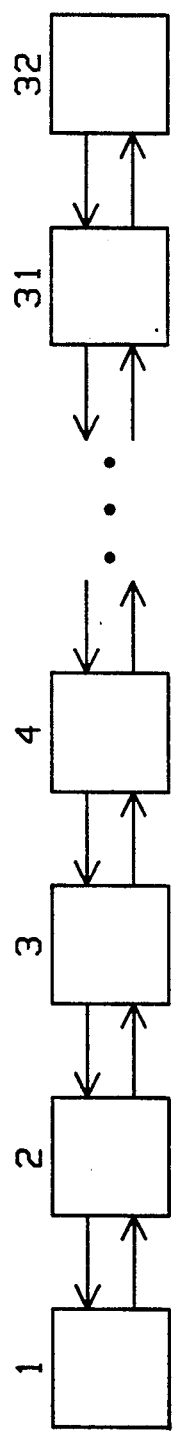
FIG. 3 is a diagram of the queue structure of the IOP TX Queue of the present invention.

In the preferred embodiment of the present invention, IOP TX Queue 92 is implemented as a data structure known as a double linked list in the configuration shown in FIG. 3. Double linked lists are described in, for example, *Fundamentals of Data Structures in Pascal,* by Ellis Horowitz and Sartaj Sahni, pp. 129-145, 1984, Computer Science Press, which is hereby incorporated by reference. Briefly, in a double linked list queue, each queue location (block) uses a pair of pointers, in this case NEXT_DESC and PREV_DESC indicating which block is to be considered to be logically ahead of it (next), and which is to be considered logically behind it (previous) in the order of blocks to be processed. This, in effect, forms a logically contiguous list, the order of which can be rearranged at will to produce another logically contiguous list simply by changing the pointers.

Each block in the linked list is considered to be under the control of either the MP 70 or the IOP 74 as determined by the CONTROL field. This serves as a mechanism of tracking the number of available blocks of the queue which remain. Blocks which have been filled with descriptor packets are under the control of the IOP, and are located at the logical top of the list. Free blocks are under the control of the MP and are logically located at the bottom of the list. The number of free blocks of the IOP Transmit Queue 92 is tracked with a variable or counter designated TXBLOCKS. This area tracked by TXBLOCKS may be thought of as the free TX Buffer 96 space.

In networks such as those of interest, higher level protocols are used to maintain the integrity of packets passing through the network. This is done by various known and standardized techniques such as acknowledgement schemes and packet counters which assure that each packet transmitted ultimately reaches its destination. This higher level protocol protection assures that it is safe, under circumstances of heavy loading and buffer or queue overflow, to simply discard packets which cannot be handled. The higher level protocols will detect that the packet did not reach its destination and a retransmission will occur after a period of time. However, with the present invention, it is desirable to attempt to assure that packets of greater importance are less likely to be discarded. In particular, packets generated by a Communications Processor (CP) to maintain the integrity of the network should take priority over other packets, since if the integrity of the network is not assured, communication may become impossible. It is important to note that the basic rules governing operation of a so called "MAC Bridge", per ANSI/IEEE standard 802.1, are: 1) keep packets of equal priority in order, and 2) do not duplicate packets (although discarding packets is acceptable).

In the present embodiment, there are several different basic types of packets which can be transmitted through the communications processor of the present invention. They are broken down for purposes of this invention into the following categories:

Communication Processor generated packets—These are packets generated by the CP and transmitted to other CP's to maintain the integrity of the network. They generally are used in assuring that the network retains its correct topology and functionality and are therefore essential to assure that other packets get through.

Interactive user packets—(also referred to as User Configurable Priority Packets) These are generally short packets resulting from interactive user sessions and require rapid response. An example of this type of packet is the DEC LAT packet. The present invention allows the user to specify which packets are to be sent with this higher priority category. e.g., 384—if source address=000000001111 then priority="user configurable". These packets usually have a specific protocol type or address and usually are configurable.

Normal user data packets—These are packets such as file transfer packets and the like requiring no particularly urgent response.

Multicast and Broadcast packets—These are packets which are broadcasted to all users and thus require substantial network resources to implement.

Other types of systems and networks may have other types of packets which could be similarly prioritized in accordance with the needs of the network.

In order to assure that packets of greatest general importance are transmitted with greatest reliability, the above packet types are prioritized in this invention as shown in the following table. This priority is stored in the PRIORITY field of the descriptor packet. Other prioritizations may be suitable for other embodiments.

TABLE 1

| Packet Priorities | |
| --- | --- |
| Packet Type | Priority |
| CP Generated | 0 (Highest) |
| Interactive User Data | 1 |
| Normal User Data | 2 |
| Multicast and Broadcast | 3 (Lowest) |

In order to prevent a relatively low speed port such as the those that ultimately couple to locations 22 and 24 from forcing large quantities of packets which could be transmitted at high speed to be discarded due to slow removal of packets from queue, the above priority system is used by the present invention along with a loadshedding technique to assure that the IOP Transmit Queue is effectively utilized and any discarded packets are more likely to be those of lower general importance.

To understand this process, assume for now that a table exists in the working memory for Communication Processor 30, such as the following table. This table contains loadshedding values used by the present invention. The derivation of the values are arrived at empirically for the present invention for a IOP Transmit Queue having 32 queue locations (31 of which are actually used). The best values of loadshedding factor will vary from site to site based on the type of packets and port speeds, size of the queue, etc. and can be adjusted to fit the user's particular needs. It will be evident that the largest loadshedding value should be less than or equal to the maximum number of free blocks in the queue. The table below can be viewed as a starting point for a determination of the appropriate values for the present invention using a 32 block queue (one of which is always used as an end of queue marker and is thus unavailable) and will be used for the examples herein. The table should not be viewed as limiting the present invention.

TABLE 2

| | LOADSHEDING FACTORS | | | |
| --- | --- | --- | --- | --- |
| Speed Category | Packet Priority 0 | Packet Priority 1 | Packet Priority 2 | Packet Priority 3 |
| Highest 0 | 1 | 8 | 14 | 22 |
| 1 | 1 | 10 | 16 | 22 |
| 2 | 1 | 12 | 18 | 22 |
| Lowest 3 | 1 | 14 | 20 | 22 |

Also stored in memory, in the current embodiment, is a table categorizing ranges of port speeds into several categories (four categories in the present embodiment). One embodiment of this table is shown below, but these speed ranges are not to be limiting as many others are possible. These ranges were also arrived at empirically and can be refined to provide better performance depending upon the network configuration and traffic characteristics.

TABLE 3

| SPEED CATEGORIES | |
| --- | --- |
| Port Speed | SPEED CATEGORY |
| >1MBPS | 0 |
| 0.5MBPS to 1.0MBPS | 1 |
| 56KBPS to 0.5MBPS | 2 |
| <=KBPS | 3 |

Those skilled in the art will recognize upon further consideration that TABLE 3 provides only a coarse categorization of speeds since common communication speeds such as 1200 BPS and 56KBPS are categorized as the same by this table even though there is a factor of about 46 difference in these speeds. Obviously, further refinement in speed categorization is possible and improved performance can likely be obtained in many situations as will be described later. This speed categorization table, it should be noted, is designed to accommodate a very wide range of speeds and compress them into only four categories. Therefore, it is designed to favor very high speed links such as T1 over comparatively slower links thereby achieving better throughput on the higher speed links, rather than to provide fine graduations in priority to distinguish between relatively closely spaced lower speeds.

The present invention uses the loadshedding value of TABLE 2 for purposes of determining which packets can be discarded. First, however, the appropriate loadshedding value is matched up with the port speeds for a particular card by the process of FIG. 4.

Figure 4:
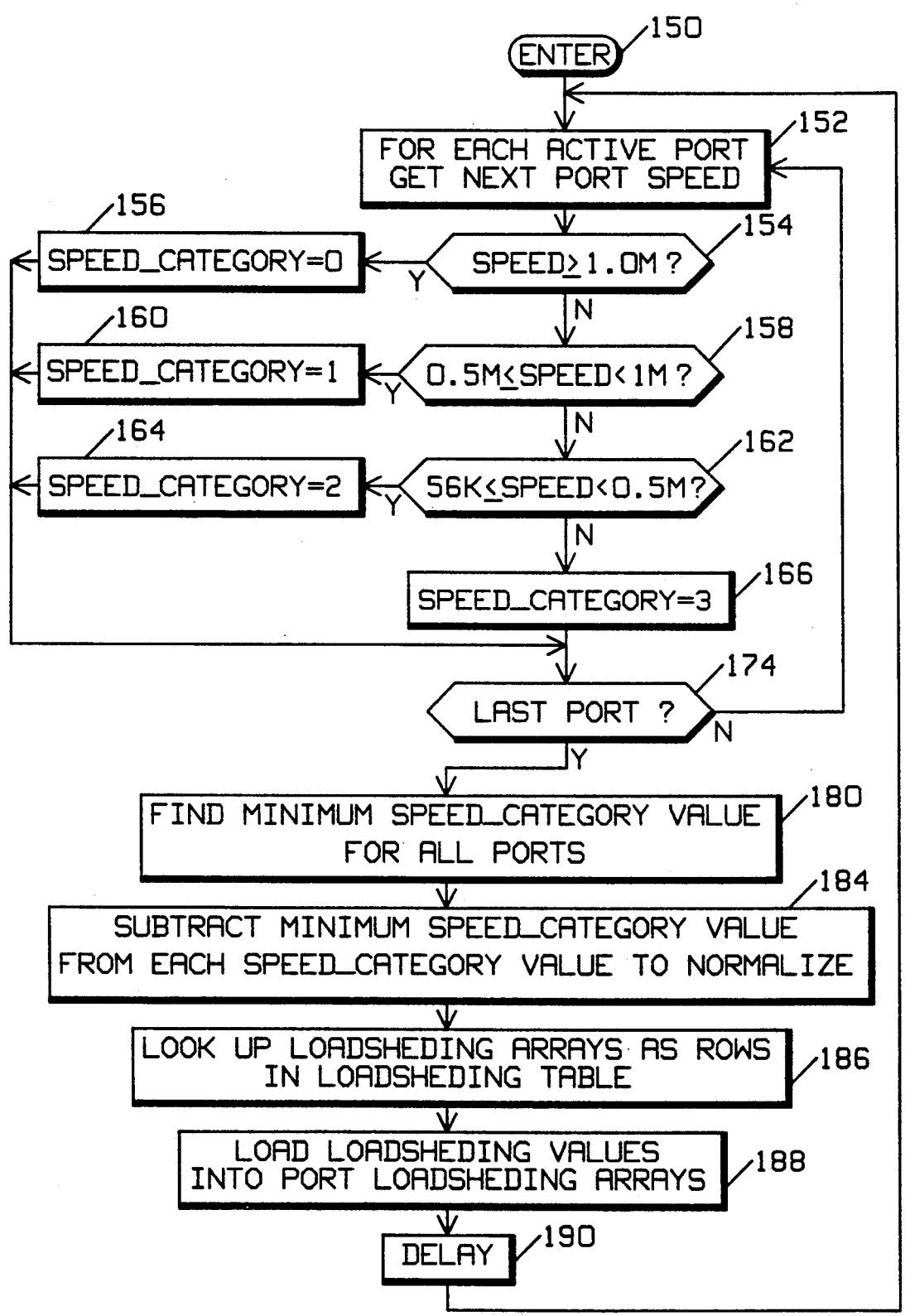
FIG. 4 is a flow chart describing the speed categorization and loadsheding array selection processes.

Turning now to FIG. 4, this routine is entered at 150 after which each port of the IOP is sequentially retrieved at 152 for a determination of appropriate categorization of speed (SPEED_CATEGORY). At step 154, the speed of the current port is compared with 1.0 MBPS. If it is greater than or equal to 1.0 MBPS, the SPEED_CATEGORY value is set to equal 0 at step 156 which represents the highest speed category. If not, step 158 compares the port speed with 0.5 MBPS and 1.0 MBPS to determine if the port speed is between these two values. If so, SPEED_CATEGORY is set equal to 1 at step 160, the second highest speed category. If not, the port speed is compared with 56 KBPS and 0.5 MBPS at step 162. If the port speed is between these two values, the SPEED_CATEGORY is set equal to 2 at step 164. If not, the only remaining value of SPEED_CATEGORY is 3 which is set at step 166. A similar sequential set of comparisons can be made in other embodiments using different speeds or categories.

After the appropriate value of SPEED_CATEGORY is selected by either step 156, 160, 164 or 166, control passes to step 174. At step 174, if the last port has not been processed, the next active port speed is fetched by step 152 and the process repeats until all active ports are processed at 174.

Once all of the ports have been processed, the SPEED_CATEGORY values are normalized so that the fastest port is assigned to SPEED_CATEGORY=0. This process begins at step 180 which examines each of the SPEED_CATEGORIES for each port to locate the minimum value of SPEED_CATEGORY. This minimum value is then subtracted from all of the SPEED_CATEGORY values so that the new minimum value is forced to be zero at step 184. This assures that at least one port always has the highest possible priority. Next, the loadsheding arrays are looked up as rows in the loadsheding table. Thus, if a SPEED_CATEGORY of 1 is present, the second row of the table is selected as the loadsheding array. Finally, at step 188 these loadsheding arrays are loaded into a predetermined memory location allocated to each port's loadsheding array.

A delay 190 of, for example one second, is then imposed and the routine returns to step 150 where the process repeats itself. In this manner, as new ports are made active, they are automatically evaluated and loaded with an appropriate loadsheding array and the other active ports are reevaluated in light of the newly active port. In addition, since some data communication devices operate at varying speeds depending upon circumstances such as line conditions, etc., this repetitive scheme permits the loadsheding values to be updated periodically to accurately reflect the condition of the network.

Consider the following example of the operation of the process of FIG. 4, for the communication processor 30 of FIGS. 1 and 2. When ports A and B are inspected, they will be categorized as SPEED_CATEGORY=0 since they are high speed T1 links. In a similar manner, ports C and D will be categorized as SPEED_CATEGORY=2 since they are both 56K links. Therefore, the initial loadsheding array for ports A and B correspond to the first row of TABLE 2, namely (1,8,14,22). Similarly, the initial loadsheding array for ports C and D correspond to the third row of TABLE 2, namely (1,12,18,22). The algorithm seeks to set the highest speed port as SPEED_CATEGORY=0 using a normalization process. The minimum value selected as SPEED_CATEGORY in this case is 0, therefore the normalization process need not be carried out for this example, and the loadsheding array values remain unchanged. In other embodiments of the invention, the presence of a single SPEED_CATEGORY=0 can be used to cause the normalization process to be omitted in the interest of conserving processing power.

Consider now another example with four ports where the port speeds are Ports A=Port B=56K, Port C=64K and Port D=19.2K. In this example, the initial SPEED_CATEGORY values for ports A, B, C and D respectively are 2, 2, 2 and 3. The algorithm seeks to normalize this so that the fastest ports are given highest possible priority by subtracting the minimum value of SPEED_CATEGORY from all of the SPEED_CATEGORY values. In this case, the minimum value is 2, so after subtracting this from all of the port SPEED_CATEGORY values, the result is a selection of 0, 0, 0 and 1 respectively for ports A, B, C and D. Thus, the loadsheding factors used for this example are those of the first and second rows of TABLE 2, namely (1,8,14,22) for Ports A, B and C, and (1,10,16,22) for Port D.

Figure 5:
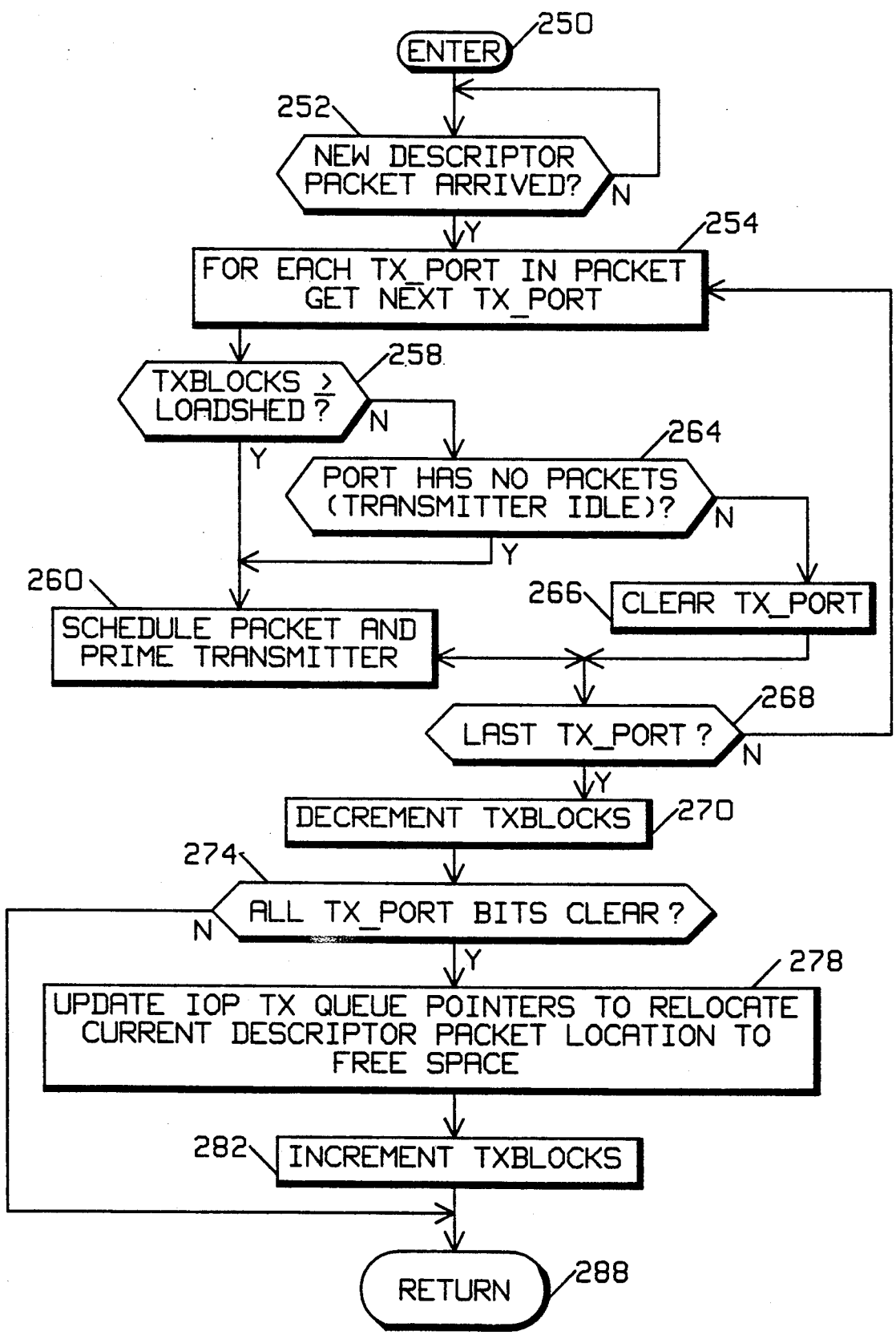
FIG. 5 is a flow chart describing the action of the I/O Processor in handling newly arrived packets.

Once the loadsheding arrays are properly loaded into the appropriate memory locations, they are used to determine how to install incoming packets into the IOP TX Queue 92. This process is described in connection with the flow chart of FIG. 5 which begins at step 250. At step 252, the routine continually looks for the arrival of a new descriptor packet in the IOP TX Queue 92 for processing. When one arrives, the descriptor packet's TX_PORT field is examined to determine which of the port or ports should transmit the corresponding full packet stored in the TX Buffer 96. For each set bit in the $TX_{11}$ PORT field at 254, the loadsheding value for that port associated with the PRIORITY of the packet is fetched.

At step 258, the loadsheding value is compared with the current value of TXBLOCKS which is a value indicative of how many blocks of the IOP TX Queue 92 are currently available (i.e. present in the free space). If there are at least as many TXBLOCKS available as required by the loadsheding value, then the packet is scheduled by loading it into the TX Port Queue 94 associated with the current set TX_PORT value at step 260. Otherwise, control passes to step 264 which checks to see if the TX Port Queue 94 associated with the TX_PORT field has no packets loaded for transmission. If so, control similarly passes to step 260 since the port clearly can support transmission of the packet if no other packets are in queue to be transmitted over that port.

If the TX Port Queue 94 is not empty at 264 after having failed the comparison at step 258, control passes to step 266 which clears the present value of TX_PORT, in effect forcing the packet not to be transmitted over the current port and thus discarding the packet. Recovery from the discarding of the packet then becomes the task of a higher level protocol.

Once the packet is either scheduled at 260 or the TX_PORT bit cleared at 266, step 268 determines if the last TX_Port has been processed. If not, control returns to step 254. If so, control passes to step 270 where the value of TX_BLOCKS is decremented since it is likely that there is now one fewer TX_BLOCKS available. Control then passes to step 274 which inspects the value of the TX_PORTS field to determine if all of the bits have been cleared. If so, control passes to step 278 which updates the IOP TX Queue 92. This is done by changing the values of NEXT_DESC and PREV_DESC to relocate the current block to a free area of the double linked list. Then, at step 282, the value of TXBLOCKS is incremented since a block of the IOP TX Queue 92 has been freed by step 278. After step 282 or if all TX_PORTS are not cleared at step 274, the routine returns at step 288.

The above process describes the manipulation of the TX_PORT values as well as the TXBLOCKS and loading of the TX Port Queue 94 and IOP TX Queue 92 as new packets arrive for transmission. These values are similarly manipulated and updated upon completion of transmission of a packet as described in connection with FIG. 6.

Figure 6:
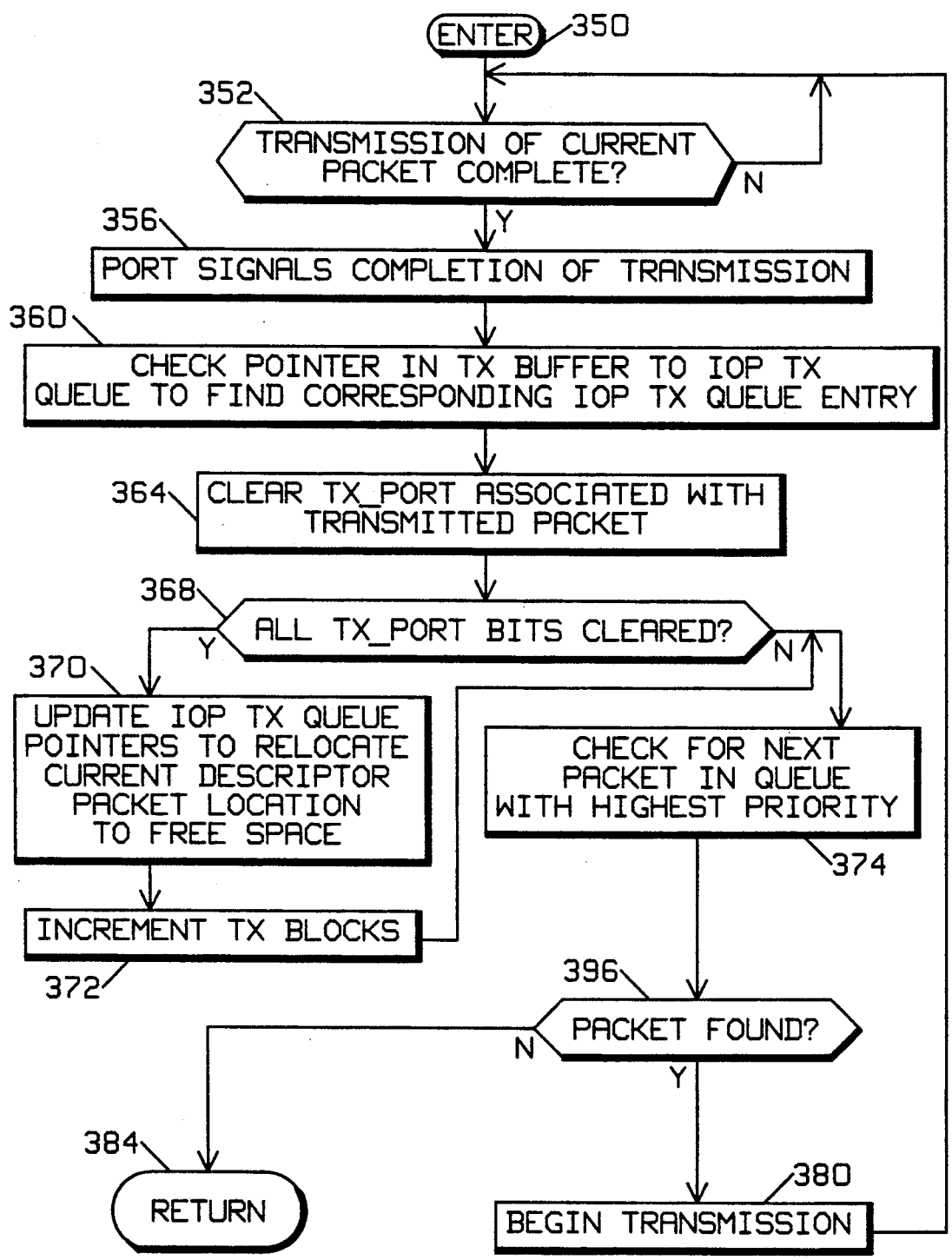
FIG. 6 is a flow chart describing the action of the I/O Processor upon completion of transmission of a packet.

Turning to FIG. 6, the routine is entered at step 350. At step 352, the status of the transmission of the current packet at a particular port is monitored. When transmission of the current packet is completed, the port interface hardware signals that the packet transmission is completed at step 356. Next, the pointer in the TX Buffer 96 to the IOP TX Queue 92 is checked to find the corresponding entry in the IOP TX Queue 92. That is, the packet which has just been transmitted has an entry in the IOP TX Queue 92 which must be identified. This is accomplished by checking a pointer in the TX Buffer 96. The entry into the TX Port Queue 94 points back to the IOP TX Queue 92 which contains the TX_PORT bits field. The TX_PORT value associated with the current port is then cleared from this entry at 364.

Step 368 then determines if all of the TX_PORT bits have been cleared. If so, control passes to 370 where the IOP TX Queue 94 pointers are updated as in step 278 of FIG. 5 to move the descriptor packet's location to the free space. Next, the TXBLOCKS value is incremented at step 372 and control passes to 374. Control also passes to step 374 if all of the TX_PORT bits are not clear at step 368.

At 374, the routine checks the TX Port Queue 94 is inspected to find the next block with the highest PRIORITY (lowest actual numerical value). If no packets are found in the queue, the routine ends at 384. If a packet is found, transmission of that packet begins at step 380 after which control returns to step 352.

In the above transmission process, an initial transmission is initiated by activating a port transmitter upon the receipt of a first packet by the TX Port Queue 94. This in effect "primes the pump", in the sense described in step 260 of FIG. 5. That is, if there is no packet currently transmitting when a new packet comes in, the newly scheduled packet will begin transmission immediately.

Figure 7:
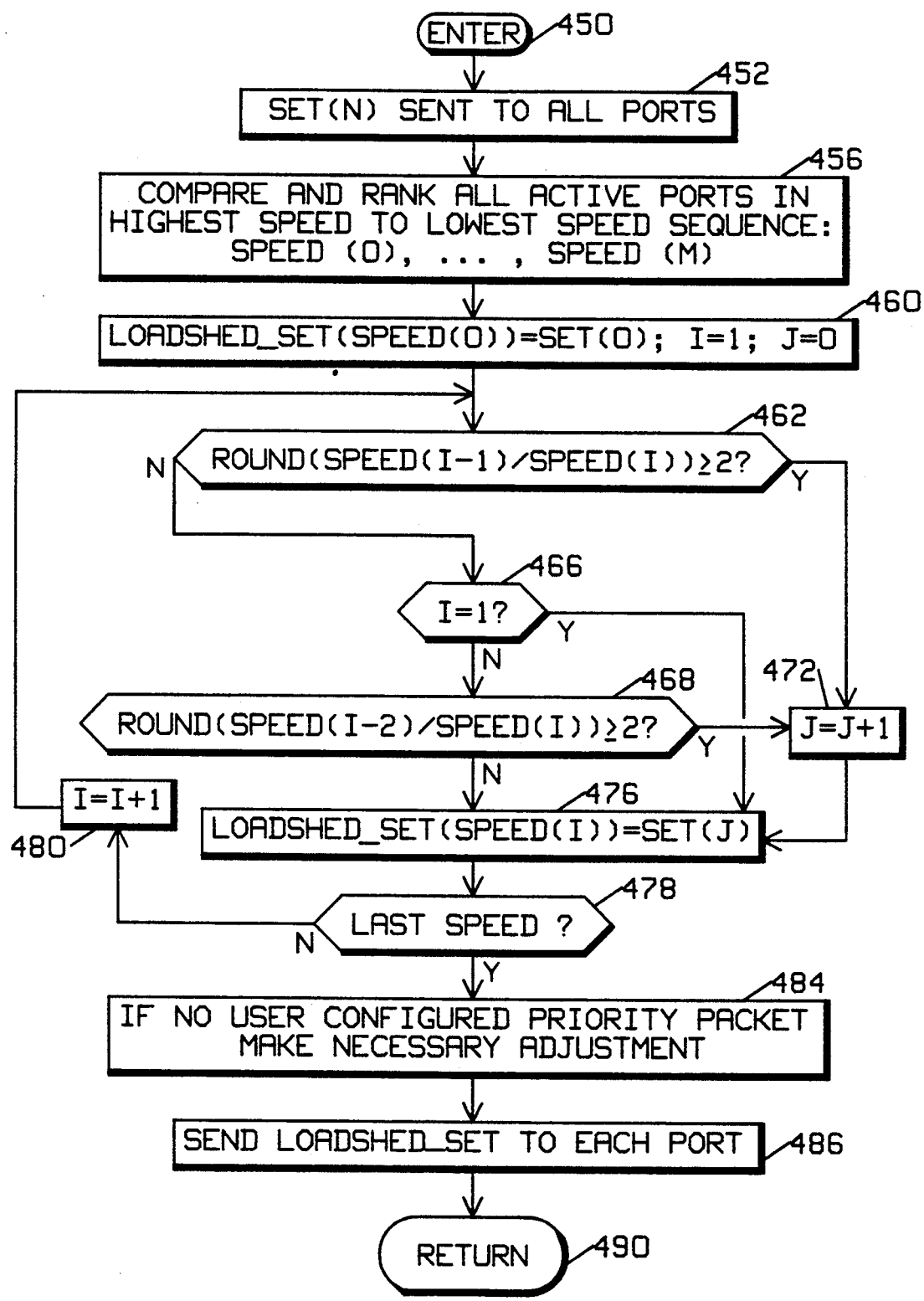
FIG. 7 is a flow chart describing an alternative embodiment of the present invention.

Many variations of the present invention will occur to those skilled in the art. An example of such a variation is shown in FIG. 7, which (as well as the above embodiment) assumes that processing is done using integer arithmetic to speed processing. In FIG. 7, it is further presumed that a user-configured priority packet is permitted. (Interactive packets usually have specific protocol type of addresses and usually are configurable).

The process of FIG. 7 begins at step 450 at system initialization. At step 452, the SPEED_CATEGORY of each active port is initialized at the lowest priority, and thus, the array (1,14,20,22) is sent to each port as an initial value. In this example, SPEED_CATEGORY=3 is assumed. This is referred to as SET(N) where N=3, the number of categories—1, in the drawing (i.e. SET(3) is the last row, SET(0) is the first row, etc.) Next, the speed of all active ports is examined and the ports are ranked according to speed at step 456. This ranking is represented to as SPEED(0), . . . , SPEED(N) in the drawing. At step 460, the loadshedding table row number is represented as the indexed variable LOADSHED_SET and the variable is initial as LOADSHED_SET(SPEED(0)) =SET(0). In addition, counters I and J are initialized to 1 and 0 respectively.

In the next process steps, the port speeds are categorized by determining whether or not a factor of 2 in speed exists between the ports of adjacent speed. The concept is that a factor of two or difference in speed warrants a difference in priority of the ports. Ports lacking a factor of two difference in speed are given the same priority. Such a scheme avoids situations such as in the first example where ports with 56K speed are given the same priority as ports with 19.2K speed. (But, note that compared to T1 speeds, both of these speeds are extremely slow and should rightfully be given substantially lower priority.) At step 462, the ratio of SPEED(I−1) and SPEED(I) is rounded to the nearest integer. If this ratio is not greater than or equal to 2, control passes to step 466. If the ratio is greater than or equal to 2, control passes to 472 where J is incremented. At 466, if I is equal to 1, step 468 is bypassed and control passes to step 476. If at 466 I is not equal to 1, control passes to step 468. At 468, the ratio of SPEED(I−2) to Speed(I) rounded to the nearest integer is checked to determine if it is greater than or equal to 2. If so, control passes to step 472 where J is incremented.

At step 476, LOADSHED_SET(SPEED(I)) is set equal to SET(J). At step 476, which flows from steps 466, 468 and 472, the routine determines if the last SPEED has been processed. If not, I is incremented at step 480 and control returns to 462. If so, control passes to step 484 to determine what if any adjustment should be made due to user configured priority packets (for example . . . ) At step 486 the LOADSHED_SET is sent to each port and the process returns at 490. As in the process described previously, this routine can be modified in any number of ways or repeated periodically.

Other variations of this process can be envisioned, for example, the following outlines a first variant process:
1. At powerup initialize SET(3) as data for each port. This gives CP generated packets highest relative priority and assures network integrity.
2. When a port comes on line, its clock speed is compared with all active ports. The speed of the ports are then ranked as SPEED(0), . . . , SPEED(N) and distributed into N speed ranges (e.g. for N=4; the boundaries of the speed ranges might be 0.9MBPS, 450KBPS, and 150KBPS).
3. Allocate loadshed values such that the fastest port gets SET(0), second fastest gets SET(1), etc.
4. If more than one port falls in the lowest speed range, use the process of FIG. 7 to distinguish them. The starting set should not be SET(0).
5. If no user-configured priority packet is configured, (normal user data) single-destination queue will use the same loadsheding value as the user-configured (interactive user data) priority queue. When a priority packet is configured into the IOP board, adjustment should be made to give single-destination queue its own loadsheding value.

Another variation of this process is described below:
1. At powerup initialize SET(3) as data for each port.
2. When a port comes on line, its clock speed is compared with all active ports. The port with highest speed is indexed as LOADSHED_SET(SET(0)). The speed are then ranked as SPEED(0), . . . , SPEED(N).
3. Allocate loadshed values such that the fastest port gets SET(0). A port with SPEED(X) is given:

LOADSHED_SET(SET(Y))
where Y=Minimum(Round(SPEED(0)/SPEED(X),3).
4. If no user-configured priority packet is configured, single-destination queue will use the same loadsheding value as the user-configured priority queue. When a priority packet is configured into the IOP board, adjustment should be made to give single-destination queue its own loadsheding value.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. An internetworking communication processor for receiving a plurality of received packets of data and for transferring said received packets to one of a plurality of ports, each of said ports having one of a plurality of port speeds, comprising:
   generating means for generating a plurality of descriptor packets, one of said descriptor packets correlating with each of said plurality of received packets, said one descriptor packet including a priority field containing one of a plurality of transmit priorities for said each received packet and a port destination field identifying which of said ports is a destination port over which said each received packet is to be transmitted;
   a transmit queue having a plurality of queue locations for receiving said descriptor packets;
   availability determining means for determining a number of said queue locations available to receive said descriptor packets;
   loadsheding means for determining a loadsheding value for each of said descriptor packets based upon said destination port and said transmit priority of said each descriptor packet;
   comparing means for comparing said loadsheding value with said number of said queue locations;
   loading means for loading said each descriptor packet into said transmit queue if said loadsheding value is less than or equal to said number of said queue locations;
   discarding means for discarding said each descriptor packet in the event said loadsheding value is greater than said number of said queue locations; and
   transmitting means, in response to said each descriptor packet being loaded in said transmit queue, for transmitting one of said received packets correlating with said each descriptor packet over said destination port identified in said each descriptor packet.

2. The internetworking communication processor of claim 1, wherein said transmitting means includes a plurality of port queues, there being one of said port queues corresponding to each of said plurality of ports; said transmitting means being operable for transferring at least a portion of said each descriptor packet from said transmit queue to one of said port queues corresponding to said destination port identified in said each descriptor packet; said portion including at least said transmit priority; said plurality of descriptor packets defining a plurality of said portions and said transmitting means further being operable for selecting one of said portions in said one queue having a particular one of said transmit priorities and transmitting said received packet correlating with said selected portion in preference to other said received packets.

3. The internetworking communication processor of claim 2, wherein said communication processor further includes transmit buffer means for storing said received packets until transmitted by said transmission means.

4. The internetworking communication processor of claim 1, wherein said transmit queue comprises a double-linked-list queue; each of said queue locations having a pair of pointers; one of said pointers indicating which of said queue locations is logically ahead of said each queue location and one of said pointers indicating which of said queue locations is logically behind said each queue location.

5. The internetworking communication processor of claim 1, further comprising means for periodically determining said one port speed for said each port, whereby a change in said one port speed for said each port may change said loadsheding value for any one of said descriptor packets having said each port as said destination port.

6. The internetworking communication processor of claim 1, wherein said loadsheding factors increase in value as said port speeds decreases in value.

7. The internetworking communication processor of claim 1, wherein said loadsheding factors increase in value as said transmit priorities increases in value, where the lowest said value of said transmit priorities represents said descriptor packets with the highest priority for transmission over a given said port.

8. The internetworking communication processor of claim 1, said loadsheding means includes grouping means for grouping each of said port speeds into one of a plurality of predetermined speed ranges.

9. The internetworking communication processor of claim 8, wherein said loadsheding means further includes array means for providing a plurality of arrays of loadsheding factors, said array means including a memory for storing said plurality of arrays, there being one of said arrays for each of said predetermined speed ranges and within said one array there being one of said loadsheding factors for each of said transmit priorities.

10. The internetworking communication processor of claim 9, wherein each of said predetermined speed ranges are identified by one of a plurality of predetermined speed numbers, one of said predetermined speed numbers having the lowest value being associated with one of said predetermined speed ranges having the highest possible port speeds; said grouping means further includes normalizing means for normalizing said predetermined speed numbers correlating with said port speeds and said array means being operable for accessing only said arrays of said transmit priorities associated with said normalized speed numbers.

11. The internetworking communication processor of claim 10, further comprising means for periodically determining said one port speed for said each port, and wherein said array means selects a different said array of said loadsheding factors whenever said one port speed is determined to have changed said grouping for said one port speed.

12. The internetworking communication processor of claim 11, wherein one of said transmit priorities is assigned to each of a plurality of different types of said received packets.

13. The internetworking communication processor of claim 10, wherein said loadsheding factors increase in value as said predetermined speed numbers increase in value.

14. The internetworking communication processor of claim 13, wherein said loadsheding factors increase in value as said transmit priorities increase in value, where the lowest said value of said transmit priorities represents said descriptor packets with the highest priority for transmission over a given said port.

15. The internetworking communication processor of claim 1, further comprising means of decrementing said number of said available queue locations when said each descriptor packet is loaded into said transmit queue.

16. The internetworking communication processor of claim 1, further comprising each of said ports being coupled to a different one of a plurality of outgoing communication links and said plurality of received packets being received from at least one inbound communication link.

* * * * *